United States Patent [19]

Norris

[11] 3,787,826

[45] Jan. 22, 1974

[54] SPLIT-PHASE ADAPTIVE DECODING ELECTRONICS

[75] Inventor: Kermit A. Norris, Azusa, Calif.

[73] Assignee: Lockheed Electronics Company, Inc. a subsidiary of Lockheed Aircraft Corporation, Burbank, Calif.

[22] Filed: Sept. 22, 1971

[21] Appl. No.: 182,915

Related U.S. Application Data

[62] Division of Ser. No. 766,531, Oct. 10, 1968, Pat. No. 3,646,546.

[52] U.S. Cl. .......... 340/174.1 H, 325/38 R, 178/68

[51] Int. Cl. .......... G11b 5/06

[58] Field of Search ... 340/174.1 H, 174.1 A, 174.1 R, 340/174.1 G, 347DD, 172.5; 325/38 A, 38 B, 55; 178/68

*Primary Examiner*—Thomas A. Robinson

*Attorney, Agent, or Firm*—Jackson & Jones

[57] ABSTRACT

A decoding system for decoding split-phase signals is disclosed. The system is operative for decoding signals which include extreme zero-crossing variations at either a fixed bit rate or variable bit rates.

A one-bit delay is employed for decoding the split-phase signals. A phase comparison circuit restores the split-phase signal (such as split-phase mark, SØM) to standard digital format, (such as non-return-to-zero-change, NRZC). A digital aperture filter removes noise in the standard format. Delay times are variable via a frequency-located feedback loop so as to accommodate speed variation during fixed or variable data rates. Different data rates are also automatically decoded by the disclosed invention.

22 Claims, 8 Drawing Figures

SPLIT-PHASE ADAPTIVE DECODING ELECTRONICS

This application is a division of application Ser. No. 766,531, filed Oct. 10, 1968, now U.S. Pat. No. 3,646,546 dated Mar. 7, 1972.

Further, this application relates to a patent application entitled "High Bit Density Record and Reproduce System" having Ser. No. 592,458, filed Nov. 7, 1966 by the same inventor and assigned to the same assignee as the present invention.

This application also relates to a patent application entitled "Derived Clock Circuit In A Phase Modulated Digital Data Handling System," having Ser. No. 715,098, filed Mar. 21, 1968 by the same inventor and assigned to the same assignee as the present invention.

BAKCGROUND OF THE INVENTION

1. Field of the Invention

This invention is applicable to digital data handling systems in both local and remote sites. Its primary application is for digital systems involving data storage and recovery on magnetic mediums.

2. This Invention Compared to Inventions of Related Applications

In the above identified patent applications, a new recording and decoding system capable of essentially error-free operation at high bit densities is disclosed and claimed.

In such a system, typical digital data wherein binary values are represented by discrete levels, such as non-return-to-zero-change (NRZC), is converted into a phase modulated signal referred to as a "split-phase signal." Particularly, the split-phase signal may be of the split-phase mark (SOM) type wherein binary ONES and ZEROS are represented by a continuous square wave signal having transitions at the beginning and end of every bit period, with a binary ONE including an additional midbit transition as compared with a ZERO which does not have an additional midbit transition.

In the aforementioned system, the decoding operation employs a one-bit delay circuit which is designed so as to exhibit a fixed delay value equal to the bit period of a preselected incoming data rate. An exclusive NOR circuit receives a SOM signal and a one-bit delay version of the SOM signal and is operative to decode these signals and yield an output in the original NRZC data format. When such a decoding system is employed with magnetic storage systems, such as tapes, disks, or drums, various system anomalies introduce noise slivers in the NRZC output from the exclusive NOR circuit. These slivers in the above identified patent applications are removed by a low-pass filter which is designed with passband criteria that is also related to the preselected incoming data rate.

3. Description of the Prior Art

Previous prior art systems for decoding binary data do not employ nor suggest my data handling techniques. Such prior art systems rely on a timing reference which is stored and recovered along with the data; or they rely on a timing reference which is locally generated at the decoding location.

One typical locally generated signal employed by the prior art systems is a phase-locked oscillator triggered by a given phase relation in the data signal to be decoded. Such phase-locked oscillators suffer from several drawbacks which prevent their successful utilization in high bit density systems. In any system, and in tape systems particularly, there are phase variations in a signal to be decoded. Such variations result from inherent system anomalies. At high bit densities a phase-locked oscillator cannot follow these phase variations quickly enough to compensate for them. In addition, a phase-locked oscillator requires numerous bit periods to synchronize the oscillator output with the data. Such synchronization must be continually updated. This updating wastes data space and time, and increases the system's complexity. In some instances, a phase-locked oscillator drops out of synchronism with the signal to be decoded thereby causing unacceptable error rates.

SUMMARY OF THE INVENTION

A variable delay circuit receives a split-phase input data train. Associated with the delay circuit is a timing source which monitors a derived clock output signal and responds thereto by automatically adjusting the delay time of the circuit. The delay times are adjusted to continually exhibit a one-bit delay corresponding to the bit period of the incoming data train. An exclusive NOR decoder receives a split-phase data signal as one input signal, and also receives a one-bit delayed version of the data signal as another input signal. The decoder yields an output signal exhibiting noise slivers caused by zero-crossing variations. These noise slivers are positioned approximately at the midbit location of discrete levels in the decoded data. A digital aperture filter receives the slivered output signal. In extreme instances the noise slivers, although not eliminated, are recorded so as to assure a steady state data level during at least the middle portion of the cell of the decoded data. In many instances the noise slivers are eliminated entirely by the digital aperture filter.

Another variable delay circuit having a delay time equal to that of the digital aperture filter compensates for the additional delay introduced by the filter. A clock circuit receives the decoded levels from the output of the aperture filter and also receives a repeated split-phase signal passed by the additional delay circuit. The clock circuit derives a clock signal aligned with the bit locations of the decoded data. The derived clock is compared with an output signal from the timing source which has been modified to match the frequency of the clock signal. A comparison circuit senses variations between the frequency of the output clock and the frequency of the timing source. This comparison circuit serves to vary the delay times of the one-bit dealy circuit, the one-half bit delay circuit, and the delay of the digital aperture filter.

BRIEF DESCRIPTION OF THE DRAWINGS:

The foregoing and other objects and features of this invention may more readily be appreciated when taken in conjunction with description of the figures in which.

DESCRIPTION OF THE PREFERRED EMBODIMENT

Figure 1:
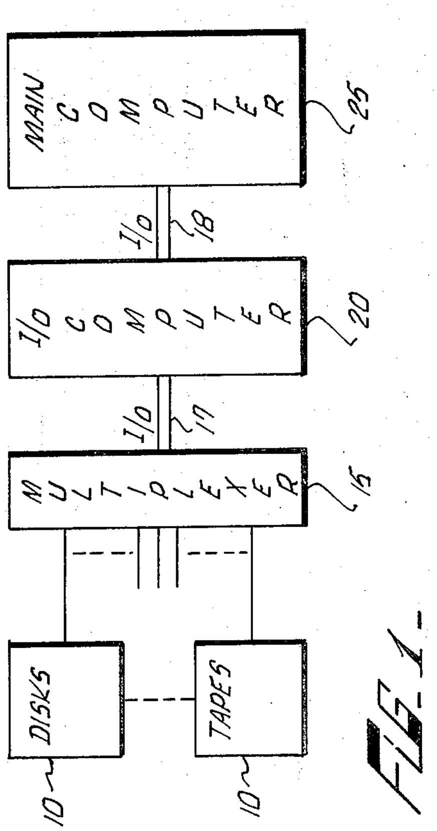
FIG. 1 is a block diagram depicting several alternative system locations for the decoding techniques of this invention.

Turning now to the drawings, the basic block diagram of FIG. 1 depicts a plurality of peripheral units 10 which may include disks, tapes, drums, etc. These peripheral units receive and transmit data at a relatively slow rate as compared to the data rate capabilities of a main computer 25.

A multiplexer 15, a buffer computer 20, and channels 17 and 18 interface the slow peripheral units 10 to the fast computer 25. Multiplexer 15 is connected to the peripheral units 10 to receive and transmit information at the slower data rates. Predetermined time intervals are allotted to each one of the peripheral units 10 by multiplexer 15 for such reception and transmission.

An input/output (I/O) channel 17 is connected between the multiplexer 15 and an I/O buffer, or computer 20. The I/O computer 20, in turn, is connected to a main computer 25 by channel 18. As mentioned, the peripheral units 10 are slow-speed units as compared to the main computer 25. This I/O computer 20 interfaces the slow peripheral units 10 with the faster operating speed of main computer 25. Thus, the I/O computer includes a memory unit which temporarily stores information from several of the peripheral units. The stored information is then provided at a higher data speed to main computer 25 over channel 18.

The decoding system of this invention as non-limiting examples, may be located at any of the peripheral units 10. It may be located at the I/O computer 20, or it may be located at the main computer 25.

If the decoder of this invention is located at the peripheral units 10, then the bit densities at these principal units may be increased significantly. Standard formats at peripheral units 10, normally include bit densities at 800 or 1,600 bits per inch. My recording and decoding techniques advances the bit densities for such units as high as 10,000 to 16,000 bits per inch. Accordingly, the associated data throughput of my invention is higher than in any known prior art systems. Speed variations at the peripheral units 10 are automatically compensated for thus allowing faster and more sophisticated data exchange between peripheral units 10 and a main computer 25.

In instances where computer 25 is a large capacity high-speed unit, several peripheral units 10 having my increased bit densities can be multiplexed in the manner described. In such instances, according to one feature of my invention, the digital I/O channel 17 is replaced by an analog signal transmission link of any well-known type and the decoder of my invention is located at I/O computer 20, or at main computer 25.

A decoder at I/O computer 20 is available for connection (either directly or multiplexed) to any peripheral unit 10 through an analog transmission link. Analog split-phase signals are stored on, and recovered from, the magnetic medium of a peripheral unit 10 at high bit densities. These signals in analog form, as contrasted to digital levels of the prior art, are applied to I/O computer 20 by an analog transmission link. At I/O computer 20 these analog signals are decoded with the techniques of this invention. In such an instance, only one I/O decoding unit is required for a plurality of peripheral units, as contrasted to one decoder for each peripheral unit when decoding is performed at the peripheral unit location.

As is often the case, the peripheral units 10 may not exhibit the same data rates relative to each other. Or, in other instances a single peripheral unit 10 will exhibit several different data rates. For example, disks often have several separate circular sections on a given side. Each section is assigned a different data rate. In the past separate decoders designed for the particular data rates of each section have been required. My decoding system will quickly and automatically adjust its delay time so as to compensate for these different data rates. Because of this additional feature, the decoding system of my invention is particularly applicable to locations such as I/O computer 20 in that variable data rates are handled automatically irrespective of the source or the data rate.

An additional feature of my invention is that it provides wider ranges in immunity to speed variations than prior art approaches. Thus, wide-range speed variations of the magnetic medium relative to signal processing heads are rapidly and readily compensated for by a frequency locked feedback loop which variably controls my delay times. The foregoing features are described in more detail hereinafter.

Figure 2:
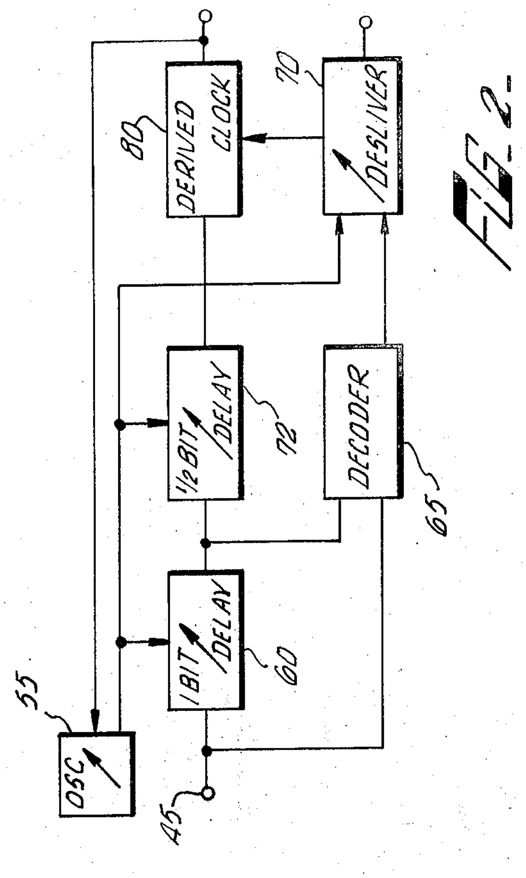
FIG. 2 is a block diagram of the decoding system of this invention.

Turning now to FIG. 2, a split-phase data signal having either a fixed data rate or a variable data rate, is received at input terminal 45. An output oscillator 55 is initially set to yield an output signal having a repetition rate which is several times higher than the bit rate of data received at terminal 45. Output signals from oscillator 55 are applied to delay circuit 60, desliver filter 70, and delay circuit 72. The oscillator frequency controls the delay times provided by these circuits in a manner fully described hereinafter.

A decoder circuit 65 receives the delayed and nondelayed input data signals and applies a decoded output to the deslivering filter 70. The output of decoder circuit 65, in the presence of high bit densities, may include noise slivers which are located substantially at the midbit cell locations of the decoded data. Such slivers are at the wrong location for my clock recovery circuit because my clock signal indicates data at the midbit points.

Such noise slivers, unless eliminated, may introduce errors. The desliver filter 70 reorders or eliminates entirely these noise slivers. Since the deslivering filter 70 introduces an additional time delay in the decoding system, a second delay circuit 72 is provided. The delay time for delay circuit 72 is matched to the delay time of the desliver filter 70.

A derived clock circuit 80 employs the deslivered output (i.e., decoded data) as a gating command, and includes logic to select transitions from the split-phase signal delayed by delay 72. Phase variations affect the split-phase signal in the same manner as the data is affected. Thus, a clock signal emitted by circuit 80 always rides with the data.

The decoder 65 and the derived clock circuit 80 are described and claimed in my aforegoing mentioned patent applications and need not here be described in detail. Briefly, however, the principles of operation for my decoder 65 and my derived clock circuit 80 may be appreciated by reference to the idealized wave forms of FIG. 4A in conjunction with FIG. 3. ROW A of FIG. 4A discloses a standard digital data format which is typically referred to as non-return to zero change (NRZC). This NRZC data may be modulated with a square wave clock signal having a frequency equal to the bit rate with transitions at the beginning, middle and end of each bit cell. Both the clock and NRZC data are available from a main computer. A format converter 35, FIG. 3, at the main computer location emits a continuous square wave S0M signal such as that shown by wave form of ROW B, FIG. 4A. One suitable circuit 35 for converting NRZC to S0M in accordance with the wave forms of ROWS A and B, FIG. 4A, is fully described and claimed in my patent application entitled "High Bit Density Record and Reproduce System" having SEr. NO. 592,458 filed Nov. 7, 1966 by the same inventor and assigned to the same assignee as the present invention. It should be noted, however, that other recording processes may be employed in accordance with this invention.

Figure 3:
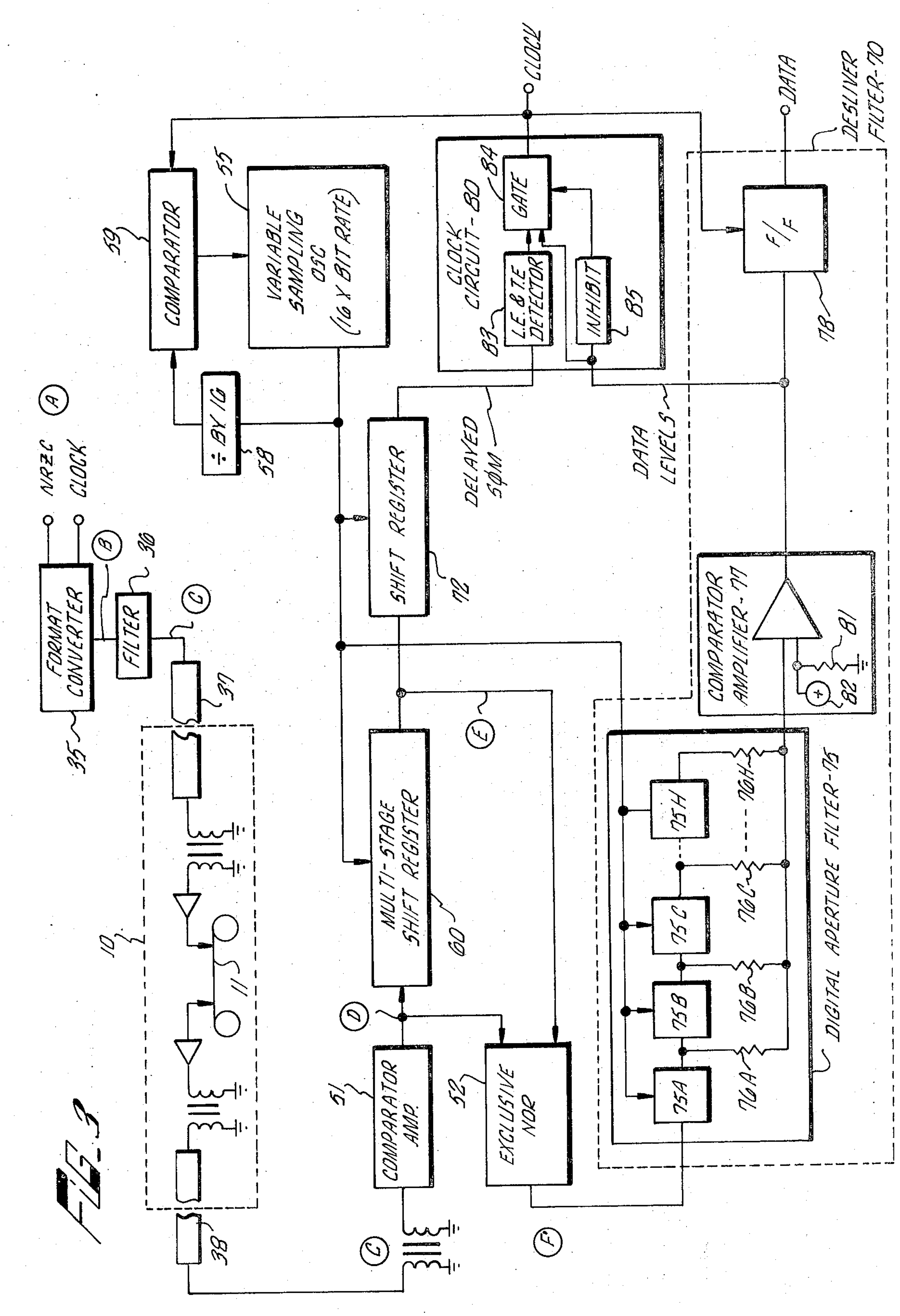
FIG. 3 is a combined block diagram and circuit format in more detail of the invention depicted in FIG. 2.
Figures 4, 4A, 4B:
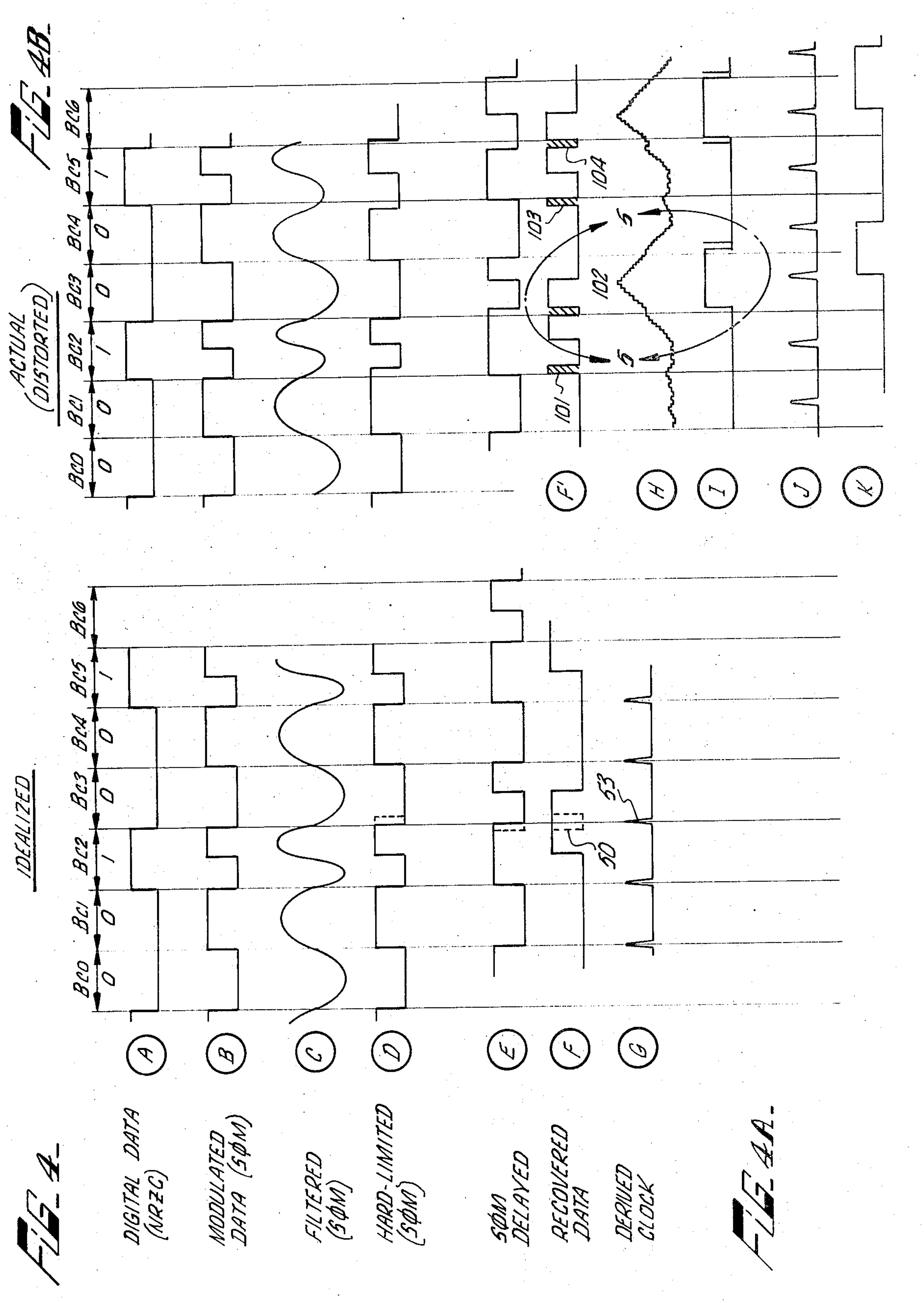
FIGS. 4*a* and 4*b* are charts of pulse and wave forms useful in promoting a clear understanding of the concepts of this invention.

A filter 36, FIG. 3, smooths the square wave S0M signal to an analog S0M signal. This analog signal is applied to an analog transmission link 37 for transmission in analog form to a peripheral unit 10 at a remote location. At the peripheral unit 10 the analog S0M signal is stored in linear or non-saturated form on a magnetic medium such as that provided at tape transport 11. Storage and recovery are both in analog form at peripheral unit 10.

Upon command, via any well-known switching network (not shown), information from peripheral unit 10 in S0M anlaog form is recovered and transmitted over an analog transmission link 38 to a decoder unit of my invention located at an I/O computer or a main computer location. The analog S0M signal includes one predominent frequency component for ONES and another predominent frequency component for ZEROS. For example, a ONES bit during binary cell BC2 is represented by a full cycle analog signal. The other major frequency component is equal to one-half the bit rate. For example, two adjacent ZEROS in bit cells BC3 and BC4 are represented by a full wave cycle. These frequency components of the analog S0M signal may be conveniently handled at high bit rates by any suitable analog transmission link. A hard-limiter circuit or a comparator amplifier 51, FIG. 3, restores the analog S0M signal to its square wave format as shown in ROW D of FIG. 4A. A delayed version of the square wave S0M signal, as shown at ROW E, FIG. 4A, is compared in an exclusive NOR circuit 52 in order to recover the NRCZ data shown at ROW F in FIG. 4A.

For purposes of clock recovery a comparison between the wave forms of ROWS E and F, FIG. 4A, indicates that the S0M wave form goes UP or DOWN one-half bit cell away from any transition in the NRZC recovered data wave form. Accordingly, the transitions in the S0M signal provides a basis for obtaining a derived clock signal of ROW G, FIG. 4A. The derived clock signal is a highly stable clock in that any phase variations introduced by system anomalies are present in the same direction and magnitude in the recovered data wave form. Furthermore, the clock pulses obtained from the transitions in the S0M signal of ROW E, FIG. 4A, inherently located in the midbit position of the recovered data signals of ROW F. As mentioned above, phase variations are present in any system. Phase variations distort the wave forms D and E of FIG. 4A as shown in dashed lines at the boundary between bit cells BC2 and BC3. These shifted zero-crossings are immediately interpreted by NOR decoder circuit 52, FIG. 3, as a temporary out-of-phase difference which results in the dashed noise sliver 50 shown in wave form F. Since the dashed noise sliver conicides with the derived clock signal 53, there is a distinct possibility for errors.

In my foregoing mentioned patent applications, these noise slivers, such as 50, are removed by an analog filter. Since such analog filters must be designed with a given bit rate in mind, there are some distinct advantages to be derived by the utilization of a desliver filter circuit which is capable of operation at any one of several different data rates. Accordingly, it is a further feature of my invention to remove noise slivers entirely or, in worse case conditions, to at least reorder the location of the noise slivers so that a derived clock pulse is guaranteed alignment with a data portion that is free of any noise slivers.

Disclosed in FIG. 3 is a variable sampling oscillator 55 having a frequency output which is sixteen times the highest expected incoming bit rate. Connected to the output of sampling oscillator 55 is a multi-stage shift register circuit 60. This shift register circuit 60 includes a plurality of series-shifted stages of any type well known to the prior art. In particular, the number of stages for shift register 60 may be 16, i.e., the multiplying factor of the bit rate provided by sampling oscillator 55. Accordingly, any input signal applied to the input of shift register 60 and shifted by oscillator 55 is delayed by precisely one bit interval.

Wave form F' of FIG. 4B includes noise slivers 101 through 104 at decoded ZERO and ONE bits. Wave form F' is applied to the input of my desliver filter 70 shown within dashed lines of FIG. 3. The desliver filter 70 includes a digital aperture filter 75. The digital aperture filter 75 includes a plurality of series-connected stages 75A through H. As is well known, the output of each of the stages in the digital aperture filter 75 are binary in nature in that the output is either HIGH or LOW depending upon the signal stored therein. An output of each stage is connected through its own summing resistor 76A through 76H. All of the summing resistors are tied to a common output for application to a comparator amplifier 77.

Reference to wave forms H and I of FIG. 4B discloses that the combination of the digital aperture filter 75 and the comparator amplifier 77 reorders certain of the noise slivers present in wave form F' such as slivers 102 and 104. Other noise slivers such as 101 and 103 are eliminated entirely. As shown by wave form J of FIG. 4B a derived clock is thus provided with an extended portion guaranteed free of any noise slivers in each of the decoded bits.

A flip-flop circuit 78, FIG. 3, is provided to reshape the wave form of ROW I of FIG. 4B and thus provide an NRCZ data output which is completely free of any reordered noise transients. This flip-flop 78 is gated by the clock output signal of ROW J and yields the output wave form shown at ROW K, FIG. 4B. It is apparent that the clock signal of ROW J, is a so-called leading edge clock with respect to the reshaped data of ROW K, FIG. 4B. If a midbit clock is desired, an additional one-half delay such as that of shift register 75 may be added at the clock output terminal of FIG. 3.

Shift register 72 of FIG. 3 is an eight-stage shift register and thus has a one-half bit delay time. The delay of register 72 is matched to the delay time of the digital aperture filter 75. The output of shift register 72 is a square wave delayed split phase mark signal which is applied to the derived clock circuit 80.

The details of my derived clock circuit 80 are described in my aforementioned patent application. Reference may be made thereto if a full and complete understanding of the circuit operation is required. Briefly, however, clock circuit 80 includes a leading and trailing edge detector circuit 83 which monitors the SOM input signal. For ZERO data levels both positive and negative transistions are gated out of logic gate 84. An inhibit circuit 85 responds to a ONE data level by removing the extra transition associated with a ONES bit in the SOM signal.

Figure 5:
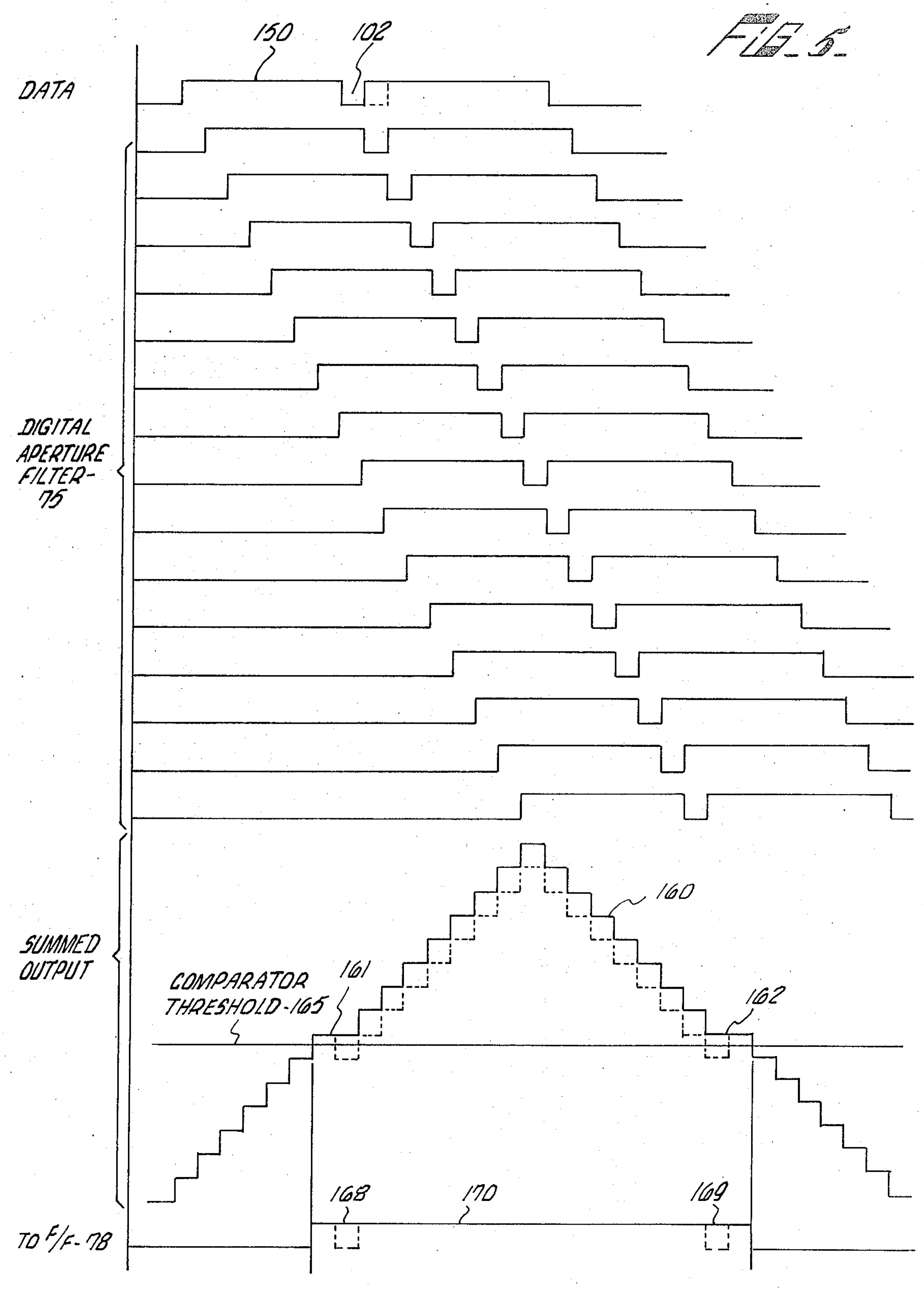
FIG. 5 is a pulse and wave form chart useful in promoting a clear understanding of the operation of the digital aperture filter of FIG. 3.

In order to fully appreciate the operation of the desliver filter 70 reference is made to FIG. 5, which depicts in enlarged time scale the decoded data output for one-bit cell as shown encircled in FIG. 4B. Wave form 150 of FIG. 5 includes noise sliver 102. The output of sampling oscillator 55, FIG. 3, serially shifts the wave form 150 (including the noise sliver 102) through the various stages 75A through 75H of the digital aperture filter 75 at 16 times the bit rate.

Accordingly, during one-bit cell duration 16 wave forms pass through the digital aperture filter 75. Wave form 160, FIG. 5, depicts the summed output obtained at the common junction of summing resistors 76A through 76H. A threshold level 165 for comparator amplifier 77 is selected, via source 82 and resistor 81, at a value which is substantially one-half the maximum peaked amplitude of wave form 160. At time $T_0$, FIG. 5, signal 160 has an amplitude in excess of threshold 165. Comparator amplifier 77 prior to time $T_0$ deslivers a LOW output level; whereas, between times $T_0$ and $T_1$, amplitude 160 exceeds threshold 165 and comparator amplifier 77 deslivers a HIGH output level as shown by wave form 170.

In many instances the noise sliver 102 will be of greater duration. For example, a noise sliver twice that of 102 is indicated by the dashed lines in input wave form 150. For this longer duration noise sliver, the summed outputs of the digital aperture filter 75 will correspond to the solid wave form 160 up to the midpoint of the plateau 161 and 162. Thereafter, wave form 160 follows the dashed version. In such an instance, the comparator amplifier 77 will produce an output which has reordered the duration of the input noise sliver into substantially equal portions 168 and 169 shown in dashed lines at output wave form 170. I have discovered that noise slivers of considerably greater duration than those capable of being accepted by any known prior art circuits are readily compensated for by the digital aperture filter 75 and comparator amplifier of my invention as described.

Noise slivers such as 168 and 169 in wave form 170 may be simple and effectively removed by applying wave form 170 as an input level to flip-flop 78, FIG. 3. Flip-flop 78 may be any standard bi-stable device which repeats the input signal at its output when clocked. The clock pulse for controlling flip-flop 78 is a data derived clock from clock circuit 80. The output of flip-flop 78 is thus repeated as standard NRZC digital data levels.

Reference was made hereinbefore to the difficulties experienced in prior magnetic storage and retrieval systems wherein speed variations are encountered. Particularly well-known offenders are tape transport systems. I have discovered that speed variations tend to reflect themselves in the data by shifting the ZERO crossings of the data wave forms whereby the boundary transitions are spaced in time at more or less than their intended bit cell durations. At the high bit densities of my system, the speed variations are of a relatively low frequency and, thus, they do not, unless such speed variations become unusually excessive, adversely affect my decoding operation. As a typical nonlimiting example, I have discovered that my decoding system will operate satisfactorily with a fixed delay in the presence of speed variations up to plus or minus 10 percent.

An additional advantage may be obtained for those instances wherein speed variations greater than the ranges discussed above exist. This additional advantage is achieved in accordance with another feature of my invention by utilizing a variable delay for each of the shift registers and for my digital aperture filter. In addition to providing a marked insensitivity to speed variations, the availability of variable delays for my decoding schemes presents another marked advantage. This additional advantage obtained by the variable delays is the ability of my decoding system to accept data trains having different data rates and automatically adjust for these different data rates without requiring prior notice of the data changes and without requiring manual settings in the decoding system.

The foregoing advantages are obtained in accordance with my invention by deriving a clock signal (circuit 80) from decoded data and thereafter by using the clock signal to control a frequency locked feedback loop. This frequency locked loop, it should be understood, is distinguished from phase locked loops of prior art synchronizing systems.

Figure 6:
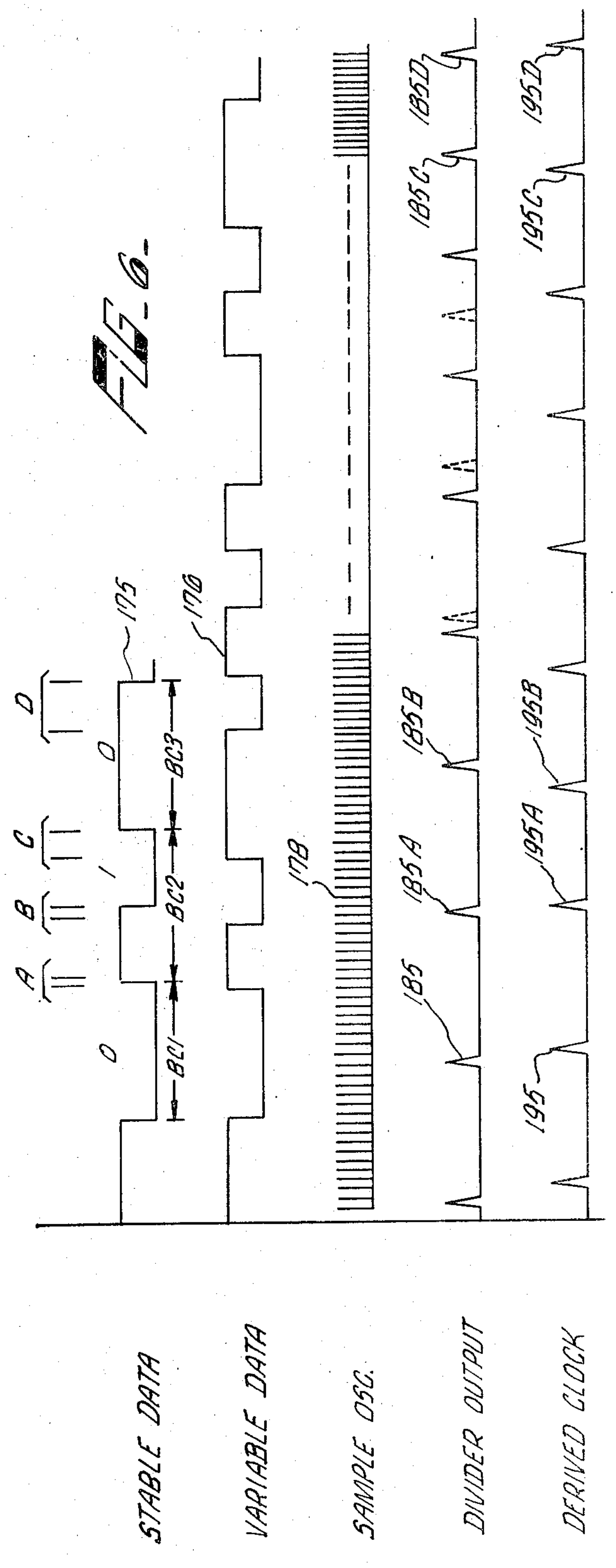
FIG. 6 is a chart of pulse and wave forms useful in clearly appreciating the variable delay capabilities of the decoding system of this invention.

This additional feature of my invention will be more fully appreciated by reference to the wave forms of FIG. 6 and the circuit schematic of FIG. 3. In FIG. 6 a wave form 175 depicts a stable data wave form of the pattern 010 during bit cell periods BC1 through BC3. Wave form 176 depicts the same data content and other bits, as well. It further illustrates a speed variation wherein the boundary transitions are moved relative to their normally expected locations. The amount of boundary location shift in the data trains are depicted by the bracketed amounts "A" through "D" as compared between 175 and 176. It should be understood that wave form 176 is illustrative only, and it is most unlikely that any speed variation at high bit densities will result in such extreme displacement in only a few adjacent bit cell periods. These displacements do, however, serve to illustrate the additional feature of my invention which automatically compensates for changes in data rates.

Wave form 178 depicts the output from sampling oscillator 55 in FIG. 3. As described hereinbefore, the sampling oscillator 55 is set to have an output rate which is 16 times that of the incoming bit rate. Accordingly, during bit cell period BC1 16 shift pulses appear. These 16 shift pulses for the 16 stage shift register 60 provide exactly one-bit cell delay. A divide-by-16 circuit 58 monitors the output of sampling oscillator 55 and emits one output for every 16 input signals. The output train from divider circuit 58, including pulse 185, is shown in FIG. 6. A clock output pulse train including clock pulse 195, FIG. 6, is emitted by the clock circuit 80, FIG. 3. Clock pulse 195 is substantially at the midpoint of bit cell BC1. Clock pulse 195 is subsequent in time to the divider output pulse 185.

A comparator circuit 59 compares the divider output signal train with the clock output signal train. Output signals of two possible polarities from comparator circuit 59 are applied to sampling oscillator 55. Sampling oscillator 55 may be any known variable oscillator which responds to an input signal such as that from comparator 59 to either increase or decrease its output frequency depending upon the polarity of the input signal applied thereto by comparator 59.

Comparison of the divider output train and the derived clock train illustrates one nonlimiting manner in which the comparator circuit 59 serves to control the output frequency of sampling oscillator 55. When a pair of clock pulses such as 195A and 195B appear between two divider output signals such as 185A and 185B, comparator circuit 59 emits one given polarity to sampling oscillator 55. Oscillator 55 increases its output frequency in response to this polarity from comparator 59. The higher frequency output is applied to shift register 60, and thus shortens the delay period afforded thereby.

As the frequency continues to increase from sampling oscillator 55, the delay period of register 60 becomes shorter.

In divider output train 185 the solid pulses indicate the delay adjustments obtained by my frequency-locked feedback loop, by comparison with the dashed pulses which indicate a fixed oscillator output rate and, therefore, a fixed one-bit delay period.

As the oscillator output continues to increase in frequency, the delay period becomes shorter than one bit period for the incoming data. In such an instance, two divider output pulses 185C and 185D, FIG. 6, appear between two clock pulses 195C and 195D. Comparator circuit 59 responds to this pulse sequence by changing its output polarity applied to sampling oscillator 55. Sampling oscillator 55 thus varies its output frequency above and below the bit period of the data being decoded. This frequency variation is within a safe margin of operation and experience has shown that my decoding technique is essentially immune to speed variations and can automatically accept a wide range of data rates.

It is to be understood that the foregoing features and principles of this invention are merely descriptive and that many departures and variations thereof are possible by those skilled in the art, without departing from the spirit and scope of this invention.

What is claimed is:

1. A digital data computer system comprising:
- a processor unit operative for performing sequencing functions utilizing digital signals in which binary values are represented by discrete signal levels;
- at least one peripheral device including transducers and a magnetic medium movable relative thereto for storing signals representing the binary values;
- means at said processor unit for converting the discrete binary representing levels to an analog form wherein binary values of adjacent bit cells are represented by phase differences thereof;
- an input-output analog transmission line connecting said peripheral device to said converting means at said processor for transmitting the digital signals in analog form;
- means at said peripheral device selectively operative for storing and recovering said analog signals on said magnetic medium in a linearized nonsaturable form; and
- a differential-phase decoder at said processor connected to said analog transmission line for converting the differential phase analog signals to binary representing levels.

2. A computer system in accordance with claim 1 wherein said differential-phase decoder comprises:
- means for squaring the received analog signal;
- means for delaying the squared signal one-bit duration; and
- means applying the non-delayed squared signal and the delayed squared signal to a phase comparison circuit adapted to emit the original binary levels in response to phase similarities or phase differences in the two compared signals.

3. A digital data computer system comprising:
- a processor unit operative for performing sequencing functions utilizing digital signals in which binary values are represented by discrete signal levels;
- a plurality of peripheral devices including transducers and a magnetic medium relative thereto for storing signals representing the binary values at a plurality of different data rates;
- a multiplexer unit connected to interface the peripheral devices to said processor unit;
- means at said multiplexer location for receiving said digital signals from said processor and converting them to analog signal form wherein binary values of adjacent bit cells at any given data rates are represented by phase differences in adjacent bit cells;
- an input-output analog transmission line connected between the converting means of said multiplexer and said plurality of peripheral devices;
- means at each of said peripheral devices operative for storing and recovering said analog signals on said magnetic medium in linearized non-saturated form; and
- a differential-phase decoder at said multiplexer location connected to said analog transmission line in common to all peripheral devices for automatically decoding, at any one of the different data rates, analog signals received over said transmission line to original binary data represented thereby.

4. A computer system in accordance with claim 3 wherein said differential-phase decoder comprises:
- means for squaring the received analog signal;
- means for delaying the squared signal one-bit cell duration; and
- means applying the nondelayed squared signal and the delayed squared signal to a phase comparison circuit adapted to emit the original binary levels in response to phase similarities or phase differences in the two compared signals.

5. A computer system in accordance with claim 3 wherein said system tends to introduce signal disturbances which vary the binary-value-representing transistions of the split-phase signal to less or more than their assigned bit cell locations, and said differential-phase decoder further comprises:
- means for varying the delay time of said delay circuit to match the variations in said transitions.

6. A computer system in accordance with claim 5 wherein said delay means comprises a clocked shift register, and said delay varying means comprises a source of shift pulses for said shift register, and means responsive to transition variations in the split-phase signal for varying the shift pulse output in a compensating direction for said transistion variations.

7. A computer in accordance with claim 6 wherein said bit cell duration is assigned in accordance with a data rate of said binary value represented by said split-phase signal, and an initially selected frequency of shift pulses emitted by said source is substantially equal to the number of tandem stages in said delay shift register times the bit rate, whereby each binary value representing portion of said split-phase signal is delayed one bit cell time by said shift register delay.

8. A computer in accordance with claim 7 wherein said time delay varying means comprises:

means for varying the output frequency of said source of shift pulses to more or less than the initially-selected frequency.

9. A decoder circuit in accordance with claim 8 wherein said means for varying the output frequency further comprises:

a frequency-locked feedback loop connected to said source of shift pulses and adapted to control the frequency output thereof in accordance with the repetition rate of signals outputted from said differential-phase decoder.

10. A computer in accordance with claim 9 and further comprising:

means for emitting a clock signal for each binary value emitted from said differential-phase decoder; an means applying said clock signal to said frequency locked feedback loop.

11. A computer in accordance with claim 10 wherein said source of shift pulses comprises:

a signal controlled variable oscillator circuit; and said frequency-locked feedback loop comprises control signal emitting means connected to said variable oscillator.

12. A computer in accordance with claim 11 wherein said frequency-locked feedback loop comprises:

means dividing the number of pulses emitted from said oscillator circuit by a number equal to the number of shift register stages for emitting one pulse each for said number of pulses; and wherein said control signal emitting means comprises:

means comparing the output of said dividing means with the output of said clock circuit for emitting first or second control signals to increase or decrease the output frequency of said oscillator circuit.

13. A computer system in accordance with claim 4 wherein the split-phase signal includes transition shifts from their assigned bit-cell locations due to random circuit disturbances, and wherein:

said differential-phase decoder emits noise slivers along with the decoded binary signals, said noise slivers being emitted at substantially a mid-bit location in response to the transition shifts; said decoder further comprising means connected to the output of said decoder for removing said noise slivers from said decoded binary signals.

14. A computer system in accordance with claim 13 wherein:

said means for removing said noise slivers from substantially their mid-bit locations comprises a digital filter.

15. A decoder circuit in accordance with claim 14 wherein said digital filter comprises:

a second multi-stage shift register having a plurality of stages connected in tandem;

means connecting the stages of said second shift register to said source of shift pulses; and signal summing means connected in common to said plurality of register stages of said second shift register for summing the signals shifted through said second shift register stages.

16. A computer system in accordance with claim 15 wherein said summing means yields a substantially regularly stepped triangular wave having said noise slivers present in the wave form as step discrepancies located essentially at a predetermined signal threshold in said stepped triangular wave; said decoder further comprising a limited circuit connected to the output of said summing means for emitting a first digital level in response to a portion of said stepped triangular wave less than said predetermined signal threshold, and a second digital level in response to the portion of said stepped triangular wave in excess of said predetermined signal threshold.

17. A computer system in accordance with claim 15 wherein said limiter circuit emits short-duration level shifts representative of the noise slivers and reordered to the leading and trailing edge boundaries of the signal emitted by the limiter.

18. A computer system in accordance with claim 17 and further comprising:

a bistable device connected to the output of said limiter circuit for emitting output levels free of the reordered noise slivers.

19. A computer system in accordance with claim 17 and further comprising:

a clock circuit for deriving a clock signal from selected transitions in said split-phase signal;

and means applying said clock signal to said bistable device.

20. A computer system in accordance with claim 19 wherein said derived clock circuit comprises:

means for selecting said transitions from said split-phase signal aligned at substantially the mid-bit location of signals emitted from said limiter circuit.

21. A computer system in accordance with claim 20 wherein said selecting means of said derived clock circuit comprises:

first deriving means for emitting a first series of pulses derived from a first direction transistion in said continuous split-phase signal;

second deriving means for emitting a second series of pulses derived from a second direction transistion in said continuous split-phase signal;

gating means connected to the output of said first and second deriving means, and means connecting said gating means to said limiter circuit for selectively inhibiting or enabling said gating means.

22. A computer system in accordance with claim 20 wherein said digital filter represents an additional delay to the decoded binary values, and said decoder circuit further comprises:

a third shift register having an input and an output respectively connected between said first shift register and said derived clock circuit, means applying shift pulses from said source to said third shift register whereby said third shift register has a delay time selected to compensate for the time delay introduced by said digital filter.

* * * * *